(12) United States Patent
Boyack et al.

(10) Patent No.: US 6,389,418 B1
(45) Date of Patent: May 14, 2002

(54) PATENT DATA MINING METHOD AND APPARATUS

(75) Inventors: Kevin W. Boyack, Albuquerque; V. Gerald Grafe, Corrales; David K. Johnson; Brian N. Wylie, both of Albuquerque, all of NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/500,729

(22) Filed: Feb. 9, 2000

Related U.S. Application Data (63) Continuation-in-part of application No. 09/409,674, filed on Oct. 1, 1999.

(51) Int. Cl.⁷ ............................................... G06F 17/30
(52) U.S. Cl. ........................................... 707/6; 707/102
(58) Field of Search .............................. 707/1–6, 7, 10, 707/100–104, 200

(56) References Cited

U.S. PATENT DOCUMENTS

| | | | | |
|---|---|---|---|---|
| 5,619,709 A | * | 4/1997 | Caid et al. ................... | 707/532 |
| 5,623,679 A | | 4/1997 | Rivette et al. ............... | 707/526 |
| 5,623,681 A | | 4/1997 | Rivette et al. ............... | 707/522 |
| 5,819,258 A | * | 10/1998 | Vaithyanathan et al. ........ | 707/2 |
| 5,930,784 A | | 7/1999 | Hendrickson .................. | 707/2 |
| 5,987,470 A | | 11/1999 | Meyers et al. ............... | 707/102 |
| 6,115,708 A | * | 9/2000 | Fayyad et al. ................ | 707/6 |
| 6,173,280 B1 | * | 1/2001 | Ramkumar et al. ............. | 707/6 |
| 6,189,002 B1 | * | 2/2001 | Roitblat ..................... | 707/1 |
| 6,212,528 B1 | * | 4/2001 | Brophy et al. ............... | 707/103 |
| 6,230,154 B1 | * | 5/2001 | Raz et al. ................... | 707/3 |
| 6,263,337 B1 | * | 7/2001 | Fayyad et al. ................ | 707/6 |
| 6,311,198 B1 | * | 10/2001 | Uramoto et al. .............. | 707/530 |

OTHER PUBLICATIONS

Davidson, Hendrickson, Johnson, Meyers and Wylie "Knowledge Mining with VxInsight: Discovery Through Interaction," *Journal of Intelligent Information Systems,* 11, 259–286, 1998 (Incorporated herein by reference).

Henry Small, ISI, SCIMAP Documentation, No Date.

Beck, Boyack, Bray and Siemens, "Landscapes, games, and maps for technology planning," *CHEMTECH,* vol. 29, No. 6, 8–16, Jun. 1999 (Incorporated herein by reference).

*Self–Organizing Map (SOM),* http://www.cis.hut.fi/nnrc/som.html, visited Sep. 8, 1999.

Hendrickson and Leland, "An Improved Spectral Graph Partitioning Algorithm for Mapping Parallel Computations," *SIAM J. Sci. Comput.,* vol. 16, No. 2, 452–469, Mar. 1995.

Irwin, Berkel, Johnson, Wylie, "Navigating Nucleaer Science: Enhancing Analysis Through Visualization," *SAND92–2218,* Sandia National Laboratories, Albuquerque, New Mexico, 1997.

(List continued on next page.)

Primary Examiner—Maria N. Von Buhr
(74) *Attorney, Agent, or Firm*—V. Gerald Grafe (57) ABSTRACT

A method of data mining represents related patents in a multidimensional space. Distance between patents in the multidimensional space corresponds to the extent of relationship between the patents. The relationship between pairings of patents can be expressed based on weighted combinations of several predicates. The user can select portions of the space to perceive. The user also can interact with and control the communication of the space, focusing attention on aspects of the space of most interest. The multidimensional spatial representation allows more ready comprehension of the structure of the relationships among the patents.

20 Claims, 4 Drawing Sheets

OTHER PUBLICATIONS

R. M. Rohrer, D. S. Ebert, J. L. Sibert, "The Shape of Shakespeare: Visualizing Text Using Implicit Surfaces," IEEE Symposium on Information Visualization '98, 121–129, 1988.

M. Song, "A Cluster–Based Information Technique," IEEE Symposium on Information Visualization '98, 130–136, 1998.

B. Hetzler, P.Whitney, L. Martucci, J. Thomas, "Multi–Faceted Insight Through Interoperable Visual Information Analysis Paradigms." IEEE Symposium on Information Visualization '98, 137–145, 1998.

T. M. J. Fruchterman and E. M. Reingold, "Graph Drawing by Force–directed Placement," *Software–Practice and Experience,* vol. 21(11). 1129–1164, Nov. 1991.

* cited by examiner

PATENT DATA MINING METHOD AND APPARATUS

This is a continuation-in-part of application Ser. No. 09/409,674, filed Oct. 1, 1999, pending incorporated by reference herein.

PATENT DATA MINING METHOD AND APPARATUS

This invention was made with Government support under Contract DE-AC04-94AL85000 awarded by the U.S. Department of Energy. The Government has certain rights in the invention.

BACKGROUND OF THE INVENTION

This invention relates to the field of data mining, specifically the exposition of the relationships between patents.

Large patents database can provide access to millions of patents. Conventional database interfaces allow searching on various fields and keywords associated with individual patents. Relationships among patents can also provide important information, but conventional database interfaces do not make the structure of the relationships apparent.

For databases containing only a few patents, a user can read patents, analyze relationships, and draw diagrams to deduce the relationships. Databases with more than a few patents have much more information embedded in the relationships, but the relationships are too many and too complex for a user to analyze or comprehend from existing search and retrieval tools. U.S. Pat. No. 5,987,470, incorporated herein by reference, discloses a method of visualizing relationships among database items, but does not provide specific mechanisms or steps for exposing relationships common to patent databases. Consequently, there is a need for a process that allows a user to comprehend the structure of relationships among items in databases having many patents.

SUMMARY OF THE INVENTION

The present invention provides a process that allows a user to comprehend the structure of relationships among patents in large patent databases. The process transforms the relationships among patents in the database to geometric relationships. The relationships among the patents can be expressed by a weighted combination of various predicates. The structure of the relationships is more readily comprehended when communicated via the resulting geometric relationships.

The process assigns coordinates in a geometric space to each patent. The assigned coordinates locate the patents in the geometric space so that distance between two patents in the geometric space is representative of the relationship between the two patents. The process then communicates an aspect of the geometric space. The aspect can include, for example, a map-like rendering displayed on a screen. The process changes a characteristic of the communicated aspect based on the nearby items. For example, the apparent height of a surface of a map-like rendering can represent the number of items located nearby.

The process includes specific steps for expressing the relationship between two patents. The process can consider common words, the Patent Office's classification system, direct citations, common citations, and time relationships between two patents to determine the similarity between the two patents. The process can also accommodate various threshold and normalization considerations to foster a more meaningful geometric space.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides a process that allows a user to comprehend the structure of relationships among patents. The process comprises expressing the similarities between the patents, assigning coordinates in a geometric space so that the complex structure of the similarities can be understood geometrically, and displaying or otherwise communicating the geometric space.

Figure 1:
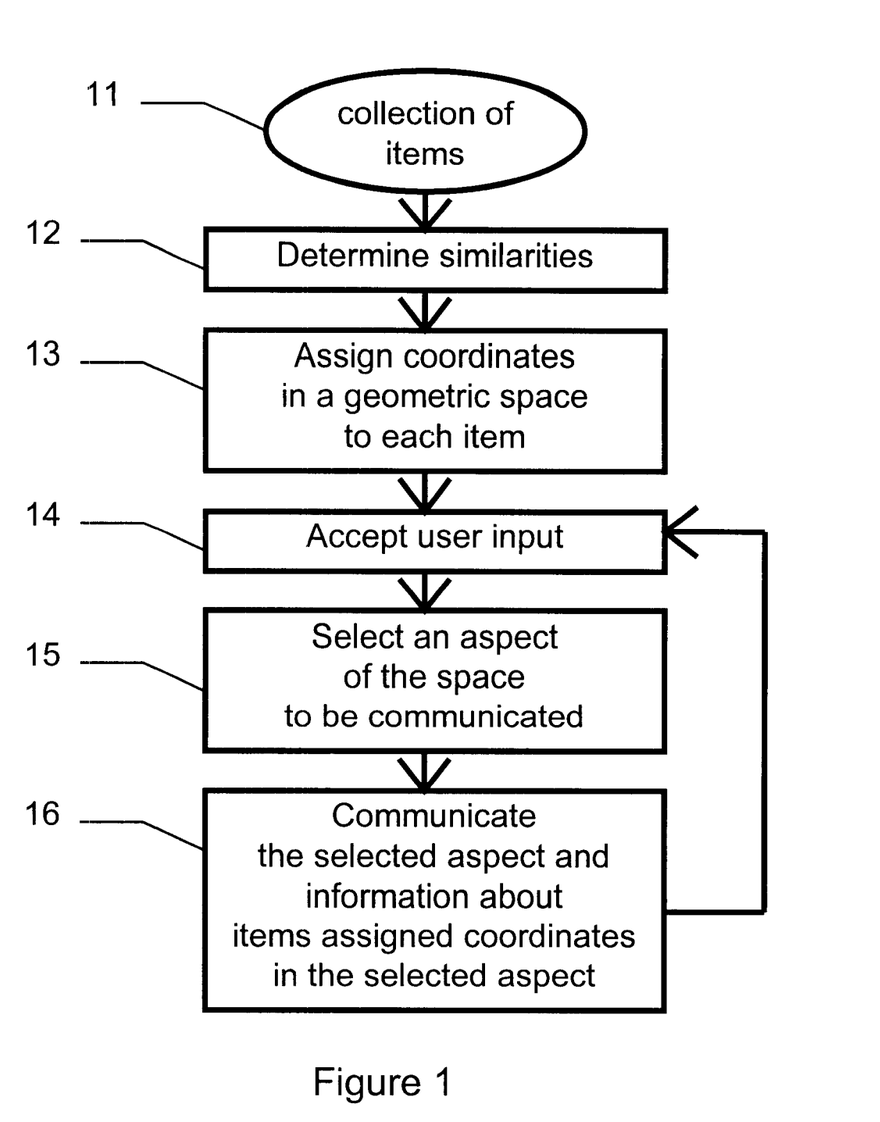
FIG. 1 is a flow diagram of a data mining process according to the present invention.

FIG. 1 is a simplified flow diagram of a data mining process according to the present invention. As used herein, data mining includes the exposition of items and relationships among patents in a database. The process begins with a database or collection of patents 11. The similarities between the patents are then determined 12. Coordinates in a geometric space are then assigned to the patents based on the similarities 13 between patents. Optionally, user input 14 is accepted to direct the communication of the geometric space, for example, by defining an aspect of the geometric space to be communicated. As used herein, an aspect is any way in which the geometric space can be regarded. Aspects can include, for example, the whole geometric space (communicate the entire geometric space), a geometric subset of the geometric space (communicate only those items assigned coordinates in a certain range), a logical subset of the geometric space (communicate only those items having certain attributes), a temporal subset of the geometric space (communicate only those items having certain time origins), and combinations thereof. An aspect of the space is selected 15. The selected aspect is communicated along with information about the patents assigned coordinates in the selected portion 16. Each of the above steps is described in more detail below.

Expressing Similarities

Various characteristics of patents can contribute to an indication of the degree of similarity between two patents. These characteristics include:

1. whether the two patents are in the same classification (using classification from the Patent Office or any other system);
2. whether the two patents are in the same subclassification (using subclassification from the Patent Office or any other system);

3. if either is assigned to more than one classification or subclassification, how many classifications or subclassifications the two patents have in common;
4. whether either patent cites the other;
5. how many citations the two patents have in common;
6. how many significant keywords or other characteristics the two patents have in common in their title, abstract, claims, or specification.

The time that has elapsed between patents can also contribute to an indication of the degree of similarity; for example, two patents in the same classification separated by many years can be less similar than two patents in the same classification separated by less time. In some coordinate assignment processes, sparser similarity matrices can reveal more information. Consequently, the expression of similarities can regard as zero similarities that fall below a threshold, or any similarities other than the highest group for a specific patent.

An expression of the similarity between two patents is given by equation 1.

$$S_{ij} = \sum_{k=1}^{m} c_k P_k f_k(t) \quad \text{Equation 1}$$

$S_{ij}$=similarity between patent$_i$ and patent$_j$
$C_k$=weighting coefficient
$P_k$=predicate
$f_k(t)$=time weighting Examples of predicates are given in Table 1.

TABLE 1

| Predicate | Valuation |
|---|---|
| $P_{class}$ | 1: patent$_i$ and patent$_j$ in the same classification<br>0: otherwise |
| $P_{subclass}$ | 1: patent$_i$ and patent$_j$ in the same subclassification<br>0: otherwise |
| $P_{numclass}$ | Count of the number of classifications that are assigned to both patents, optionally divided by the total number of classifications assigned to the patents |
| $P_{numsubclass}$ | Count of the number of subclassifications that are assigned to both patents, optionally divided by the total number of subclassifications assigned to the patents |
| $P_{numwords}$ | Count of the number of identified words that are present in both patents (either number of identified words, or number of times common identified words appear) |
| $P_{cite}$ | 1: patent$_i$ cites patent$_j$, or patent$_j$ cites patent$_i$<br>0: otherwise |
| $P_{cocite}$ | 1: both patents cite a common reference<br>0: otherwise |
| $P_{numcocite}$ | Count of the number of references cited by both patents, optionally divided by the total number of citations in the patents |

In addition to the predicates in the table, other predicates meaningful to the information being explored can be formulated. Combinations of predicates can also be used. For example, common important words can be combined with common classification to avoid indicating similarity between two patents using similar words to identify different concepts (e.g., a train of railroad cars versus a train of electronic communication pulses). As another example, different types of citations can be considered differently (e.g., citations to patents in common ownership can be considered differently than citations to patents owned by others).

The weighting coefficient corresponding to a predicate can be adjusted to adjust the effect of that predicate on the indication of similarity. For example, similarity based on common keyword might be a very strong indication of similarity for fields with specialized terminology. As another example, similarity based on common classification might be weighted less to reflect the large number of patents that can be found in a given classification. Setting a weighting coefficient to zero effectively removes any contribution from that predicate to a similarity indication; the predicate can equivalently be ignored. Some predicates can indicate that two patents are dissimilar; the corresponding weighting coefficient can have a negative value to reflect an negative effect on similarity.

The time weighting corresponding to a predicate can be adjusted to reflect varying importance of a predicate based on the time associated with the predicate. For example, two patents in the same classification can be more similar if the time between their filing dates is short than if the time between their filing dates is long. The associated time weighting can be, for example, a linearly decreasing function of time, an exponentially (or other function) decreasing function of time, a step function or series of step functions reflecting time horizons or cut-offs.

The similarity indication discussed above generates symmetric similarities, i.e., $S_{ij}=S_{ji}$. A corresponding similarity matrix can exploit this and only require one half of the similarities be determined. Some predicates might be non-symmetric (e.g., whether patent$_i$ cites patent$_j$, or whether patent$_i$ is assigned to all the classifications of patent$_j$). The full matrix would need to populated when such predicates are used.

Sparse similarity matrices can result in more meaningful coordinate assignments with some coordinate assignment methods. The similarity matrix can be encouraged toward sparseness by using time weightings that go to zero after threshold times, and by using predicates that result in zero values for values below threshold values. The similarity matrix can also be encouraged toward sparseness by only retaining the highest similarity values for each patent. For example, a global similarity threshold can be established and all similarity values below it replaced with zero. As another example, a similarity threshold can be established for each patent (e.g., the average similarity, or the similarity of the $p^{th}$ percentile) and similarities for that patent below that replaced with zero. This second example can lead to a asymmetric similarity matrix since patent$_i$ can have $S_{ij}$ replaced with zero due to other more similar patents, while patent$_j$ retains $S_{ji}$ due to fewer highly similar patents.

Equation 2 shows an example weighted combination of predicates, where the time considerations are in years.

$$S_{ij}=[0.5P_{class}+1.0P_{subclass}+0.25P_{numwords}]f(t)+1.0P_{cite}+0.5P_{cocite} \quad \text{Equation 2}$$

$$f(t) = \begin{vmatrix} 1 & \text{for } |t_j - t_i| < 5 \\ 2 - \frac{|t_j - t_i|}{5} & \text{for } 5 \leq |t_j - t_i| \leq 10 \\ 0 & \text{for } 10 < |t_j - t_i| \end{vmatrix}$$

Assigning Coordinates

The present invention locates patents in a geometric space so that patents that are the most related (i.e., have the greatest measure of similarity) are the closest together. Location processes that place related patents near each other are suitable for use with the present invention. Two example location process are given below.

Example Coordinate Assignment
1. Begin with a set of patents V(i).
2. Assign each patent in the set V(i) an index from 1 to n, where n is the number of patents.

3. Denote the similarity value between patent V(i) and patent V(j) as S(i,j). A large similarity value indicates that the two patents should be closer together in the geometric space than patents having smaller similarity values.
4. Construct a matrix A(i,j):
   a) where i≠j, set A(i,j) =−S(i,j)
   b) where i=j (on the diagonal of A), set A(i,j)=−(the sum of the other elements in the row), so that every row sums to 0.
5. Determine the n eigenvectors $u_1, u_2, \ldots u_n$, with corresponding eigenvalues $\lambda_1, \lambda_2, \ldots \lambda_n$ sorted from least to greatest.
6. Select d of the eigenvectors, from $u_2$ to $u_{d+1}$, where d is the dimensionality of the geometric space.
7. Locate each patent V(i) at the coordinates given by $i^{th}$ element of each of the selected eigenvectors $u_2$ to $u_{d+1}$.

The above process minimizes the error of placing related patents far apart, where the error is expressed as the sum, for all pairs of patents V(i) and V(j), of the square of the distance between V(i) and V(j) multiplied by the similarity between patent V(i) and patent V(j) (i.e., S(i,j)). The error function can be expressed as $x^T A x$, where x is the vector of patent coordinates. Adding a first constraint that the coordinates sum to zero factors out a constant offset that could otherwise be added to every coordinate without changing the error. Adding a second constraint that $x^T x=1$ eliminates the trivial solution where all the patent are placed at the same coordinates.

Minimal values of the error, $x^T A x$, occur at the eigenvectors of A. A, being a Laplacian matrix, has no negative eigenvalues. The eigenvector associated with the least eigenvalue is therefore the identity vector. The identity vector does not satisfy the second constraint, and so is not used to assign coordinates to the patents. Because A is symmetric, all its eigenvectors are orthogonal and so all other eigenvectors satisfy the second constraint. The eigenvector associated with the second least eigenvalue therefore corresponds to coordinates where the total error is minimized. The eigenvectors associated with the next greater eigenvalues correspond to the next lowest error values. The coordinates assigned to patents therefore transform the degree of relationship to proximity in the geometric space. The communication of the patents in the geometric space will therefore also communicate the relationships among the patents.

The values given above for the diagonal elements of A (i.e., A(i,i)) result in a Laplacian matrix. The method also works with a zero diagonal (an adjacency matrix), and with numerous other formulations for the diagonal elements. For example, R. Boppana has described a complicated convex optimization procedure. See Eigenvalues and Graph Bisection: An Average Case Analysis, Proc. $28^{th}$ Annual Symposium on Foundations of Computer Science, IEEE 1987, pp. 280–285. Generally, a Laplacian matrix is preferred to an adjacency matrix. Complex optimizations might provide a better result than a Laplacian matrix, but at the increased cost of performing the optimizations. Alternative diagonal element formulations could require different choices of eigenvectors.

Alternatively, the entire matrix can be negated, resulting in A(i,j)=S(i,j). The method is unchanged except that the selected eigenvectors now correspond to the greatest eigenvalues rather than the least, since negating the matrix negates the eigenvalues.

The coordinate assignments can also be scaled. Qualitatively, the eigenvector corresponding to the least eigenvalue captures the most significant clustering of related entities. Eigenvectors associated with higher eigenvalues capture less important clustering information. Consequently, expanding the geometric space in the dimensions associated with higher eigenvectors can more closely relate the relationships between entities to proximity in the geometric space. The eigenvalues provide a measure of the importance of the clustering information. For example, two eigenvalues very close in value indicate that the associated eigenvectors capture clustering information very close to each other in importance. Two eigenvalues with dissimilar values indicate that the associated eigenvectors capture clustering information of dissimilar importance. Accordingly, the assigned coordinates can be scaled by a function of the associated eigenvalue, for example, by the square root of the eigenvalue, the eigenvalue, or the square of the eigenvalue.

Figure 2:
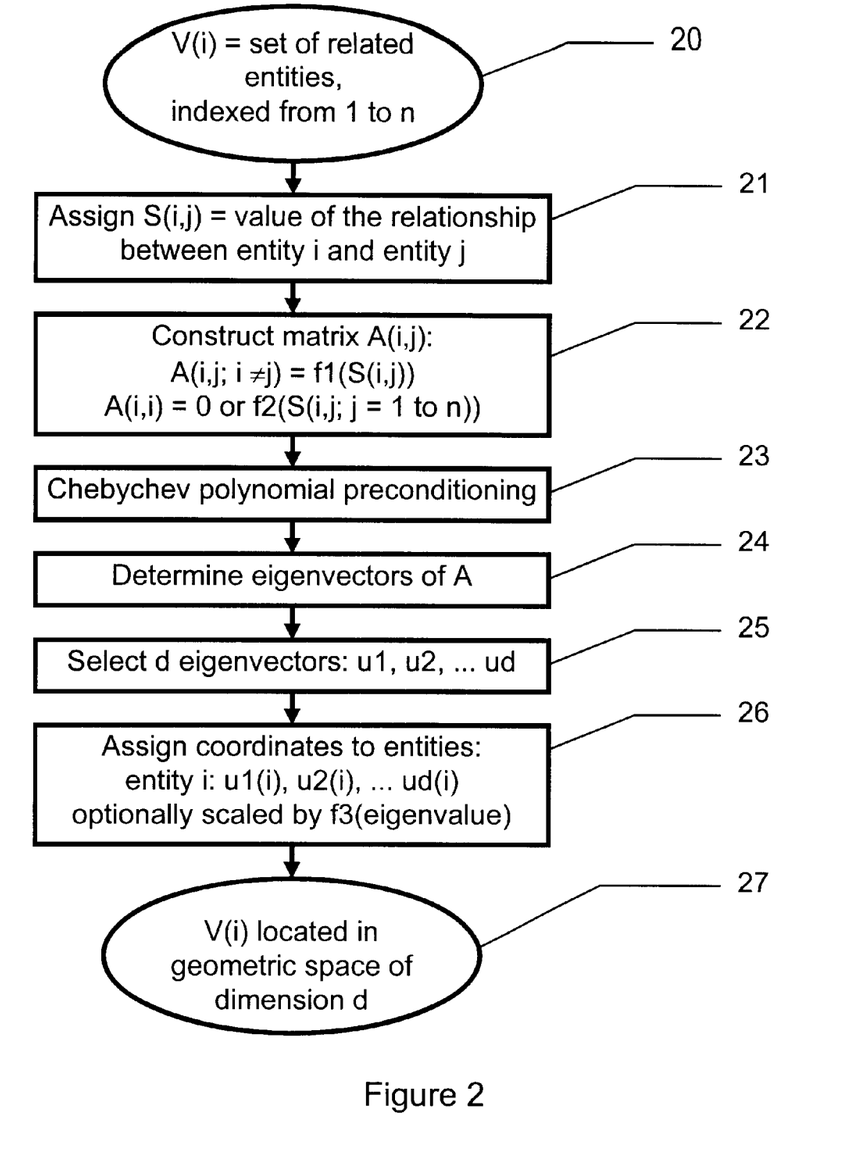
FIG. 2 is a flow diagram of coordinate assignment according to the present invention.

FIG. 2 is a flow diagram of a process coordinate assignment according to the present invention. The process begins with a set 20 of related patents V(i), indexed from 1 to n. A numerical representation of the relationship between each pair of patents is computed and assigned to S(i,j) 21. A matrix is then constructed 22, where the off-diagonal elements are assigned values based on the values of S(i,j), and the diagonal elements are assigned values of 0 or based on the values of S(i,j). Optionally, the resulting matrix can be preconditioned 23 such as by Chebychev polynomial preconditioning before finding eigenvectors of the matrix 24. Software such as ARPACK from Rice University can find eigenvectors of the matrix. The software can then select 25 d eigenvectors, where d is the dimension of a geometric space. Each patent can then be assigned coordinates 26, where patent i is assigned coordinates corresponding to element i in each of the selected eigenvectors, optionally scaled by a function of the corresponding eigenvalue. The result 27 of the process is the plurality of patents, located at specific coordinates in a geometric space of dimension d.

Example Coordinate Assignment

Figure 3:
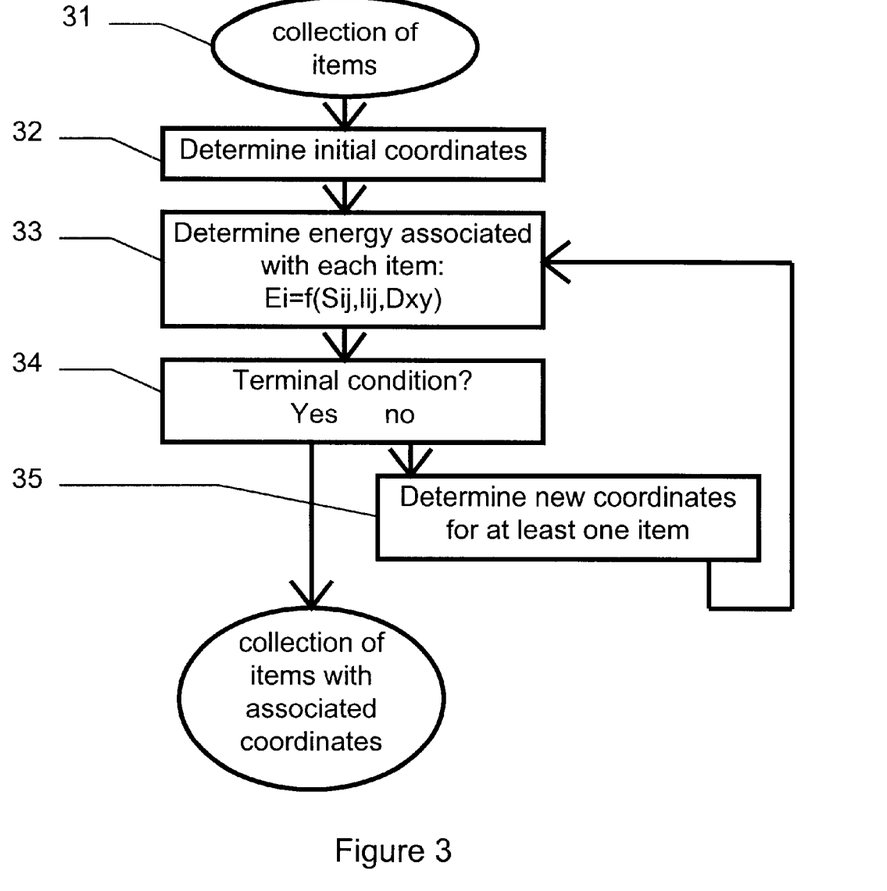
FIG. 3 is a flow diagram of coordinate assignment according to the present invention.

FIG. 3 is a simplified flow diagram of an example coordinate assignment process. The process begins with a database of patents 31. Initial coordinates in a geometric space are assigned to the patents 32. Initial coordinates can be assigned in several ways: at random, all the same, in some defined pattern, or other ways that will be apparent to those skilled in the art. An energy is determined for each patent 33 from the patent's distance to and similarity to other patents, and the density of patents assigned coordinates near the patent. If a terminal condition is reached 34, then the patents with their associated coordinates can be output for use, for example for use in storing or displaying the patents according to the coordinates. If a terminal condition is not reached 34, then new coordinates can be assigned to one or more patents 35, and the process repeated with a new energy determination. Each step is discussed in more detail below.

Initial Coordinates

Initial coordinates can be assigned in several ways. For example, all patents can be assigned the same coordinates initially. Highly similar patents will accordingly be very close together, but the density of objects will be very high. The density component of the energy determination will force the objects to spread across the space.

As another example, patents can be assigned initial coordinates at random. Both components of the energy determination will work to bring highly similar patents closer together without increasing the density of patents in any area too high.

Other ways to assign initial coordinates will be apparent to those skilled in the art.

Determining Energy Associated with Each Patent

An energy associated with each patent can be determined from the patent's distance to and similarity to other patents, and the density of patents assigned coordinates near the patent. The distance and similarity component can serve to attract patents with high similarity to each other in the space, while the density component can serve to force all patents apart (filling the space). Those skilled in the art will appreciate various combinations of the two components. An example energy determination is shown in Equation 3.

$$E_i = \left[\sum_{j=0}^{n} (S_{i,j} * l_{i,j}^2)\right] + D_{x,y} \quad \text{Equation 3}$$

In Equation 3, $E_i$ is the energy associated with the placement of patent i at coordinates x,y; $S_{i,j}$ is the similarity between patent i and patent j, $l_{i,j}$ is the distance in the space between coordinates x,y and the coordinates assigned to patent j, and $D_{x,y}$ is the density of patents assigned coordinates near x,y. The energy associated with a patent can be reduced by reducing the distance to similar patents. Reducing the distance to similar patents, however, can increase the density component. Accordingly, reducing the energy associated with a patent involves the minimization of distance to other patents with high similarities and maximization of distance to patents with no similarities. The exponent on the distance determines the 'flexibility' of the graph links. A lower exponent (e.g., 1 or 2) allows the links to stretch more freely and can lead to a better global solution. Conversely, a high exponent severely increases the energy function with any increase in distance between connected objects. This can lead to a better local solution but not necessary in a better global solution. The density function can be the summation of objects within a radius. This radius increases the energy of any objects coming within the radius. This can have the effect of 'pushing' objects without connections a least a radius away. The density function can also have an exponent applied to the summation. This exponent can be much like the exponent on the link distance: a high exponent increases the energy cost of placing objects near each other. This can lead to inflexibility of movement of particles through the space.

The function $D_{x,y}$ can be computed in many different ways. A simple approach is to base $D_{x,y}$ on the distance to all other nodes. Each node can check its position against all other nodes, requiring order(N) comparisons (where N=number of objects) for each determination of $D_{x,y}$. Each node must compute $D_{x,y}$ when determining its energy at a specific location x,y, so in total the simple approach can require order($N^2$) running time.

For large datasets an order($N^2$) running time can be prohibitively computationally expensive. Another method of computing $D_{x,y}$ can allow each node to determine an approximate value for $D_{x,y}$ in constant time (order(1)), thereby reducing the total running time to order(N). The method begins by having each node place an energy footprint onto a k-dimensional array (density field), where k is the dimensionality of the desired geometric space (two in the examples below). The energy footprint can be any function meaningful in the geometric space. For example, each object can place an energy footprint that is highest at its assigned coordinates, and decreases with increased radial distance therefrom. Other examples include k-dimensional Gaussian functions, k-dimensional sinusoidals, and other k-dimensional functions familiar to those skilled in the art. The density field can be constructed by summing each node's energy footprint. Having each node contribute an energy footprint to the density field requires order(N) time.

Once the density field is constructed, an object can determine an approximate value to the $D_{x,y}$ term by a constant time lookup into the density field at the location corresponding to the object's assigned coordinates. Having each node look up the value of the density field at their current location requires order(N) time. The combination of order(N) density field construction and order(N) lookup yields an order(N) total time, reducing the computational cost associated with determining the density component of the energy determination.

Terminal Condition

The energy represents a measure of the quality of coordinate assignment: higher energies correspond to coordinate assignments where similar patents are more separated and dissimilar patents are less separated. Adjusting coordinates so that energy is reduced can lead to patent placement that more accurately and completely expresses in the space the relationships among the patents. Minimization of energy to guide a problem space search can be addressed with various techniques known to those skilled in the art. For example, simulated annealing can be useful with the present invention.

Problem space searches, especially with very large numbers of patents, can be time-intensive. Accordingly, the search can be terminated before exhaustive search for a single minimal coordinate set. For example, the search can be terminated after a certain amount of computer time, or after a certain number of coordinate determinations and corresponding energy determinations. The search can also be terminated based on the energy determination, for example when the total energy is below a threshold or when some portion of the patents all have energies below a threshold.

New Coordinates

New coordinates can be assigned to patents in various ways. For example, simulated annealing can guide the size of the jumps from former coordinates to new coordinates for each patent. At each step, new coordinates can be proposed for one, some, or all the patents, depending on the search strategy employed. Heuristics such as those described below can reduce the time to determine acceptable coordinates, at the possible expense of finding global optimization (a common tradeoff in searches of very large search spaces).

The energy of a patent can be determined at its proposed new coordinates before accepting a new set of coordinates for the patent. New coordinates that increase a patent's energy can thereby be discarded, potentially decreasing the time required to arrive at an acceptable set of coordinates.

A concept analogous to mechanical momentum has been found to speed the search in some applications of the present invention. The direction taken at the last coordinate change (the last change that resulted in lower patent energy) can be stored. New coordinates can then be proposed that continue at least some aspects of the previous direction. For example, new coordinates can be proposed that are on a direction coincident with the previous direction, or on a direction forming an acute angle relative to the previous direction. Backtracking to previously explored regions of the search space can thereby be reduced.

Communicating the Geometric Space

Input from a user can tailor the information displayed to meet the user's specific requirements. For example, user input can direct the selection of an aspect for display, such as a subset of the geometric space. Additionally, user input can direct the display of only patents having certain attributes, such as institutional origin or time of origin. Additionally, user input can direct the display of detailed information about patents, such as more complete identification of individual patents or more detailed display of specific links among patents. User input can be accepted from a keyboard, a mouse or other pointing device, voice commands, or any other interface suitable for user interaction. Those skilled in the art will appreciate specific interface software to communicate with specific input devices. Feedback mechanisms such as sound or haptic feedback can make user interaction more intuitive.

User input can select a portion of the space for display, for example by specifying certain regions to display in more detail. User input can also direct the information about the patents displayed. Those skilled in the art will appreciate software that can interpret user input and direct display software to perform the functions directed by the user.

Directing the Display of the Geometric Space

The data mining system of the present invention can allow the user to select only certain portions of the database. For example, the user can direct the display of only patents with dates in a certain range or with particular origins. The user can direct the display of patents with certain dates, then direct the selected data range to vary with time, allowing the user to see the evolution of the database relationships over time. The user can also direct the display of only patents with certain attributes. For example, the user can direct the display only of patents within a certain distance of a selected patent, allowing the user to "zoom in" for more detail in areas of particular interest.

A user can also direct that selected patents be displayed with selected attributes (such as color or highlighting). The user can thereby emphasize and de-emphasize certain patents, for example those from one institution can be emphasized to illustrate the work of that institution in a given technology. As another example, patents with dates before a certain date can be de-emphasized, focusing the user's attention on the most recent patents.

The user can also direct that selected information be displayed or suppressed. For example, when viewing a large number of patents, the user can direct that only aggregate representations be displayed. When smaller numbers of patents are to be viewed, the user can direct that more detail be displayed for each patent. For example, names describing groups of patents can be displayed when large numbers of patents are visible; names of individual patents can be displayed when fewer patents are visible. Similarities between patents can also be displayed, with color or shape corresponding to direction and magnitude of the similarity. Because the display is based on individual patents, the user can access any information in the database concerning each patent.

Full database connectivity allows for real time user querying to extract additional information. For example, the user can direct the display to highlight papers from a specific institution or country, allowing the user to understand the relationship between sources and research areas. This additional insight can provide guidance for direction of future activity, as well as help identify sources of complementary research, anticipating potential collaborative programs. It can also help identify most likely competitors.

Displaying a Portion of the Geometric Space

The selected characteristics of the geometric space can be displayed via any approach that allows a user to comprehend a representation of a multi-dimensional space. For example, the geometric space can be communicated to the user by displaying a window looking onto a multidimensional landscape. Zooming, panning, tilting, and other display manipulations common to this type of display can be made available to the user. Requests for changes to the display can be routed directly to the database server, and the resulting changes highlighted in the display. The user can thereby focus attention on selected aspects of the structure of the database, and explore the aspect by interaction with the database.

As an alternative to displaying a window looking onto the geometric space, geometric space can be communicated to the user via an immersive environment. The user would then be "in" the geometric space, and able to interact with patents and relationships among patents. The user can then control the display and interact with the database by voice commands or by selected body movements (e.g., by pointing at a patent, turning to look at a part of the space, or pulling controls through the space).

Example System

Figure 4:
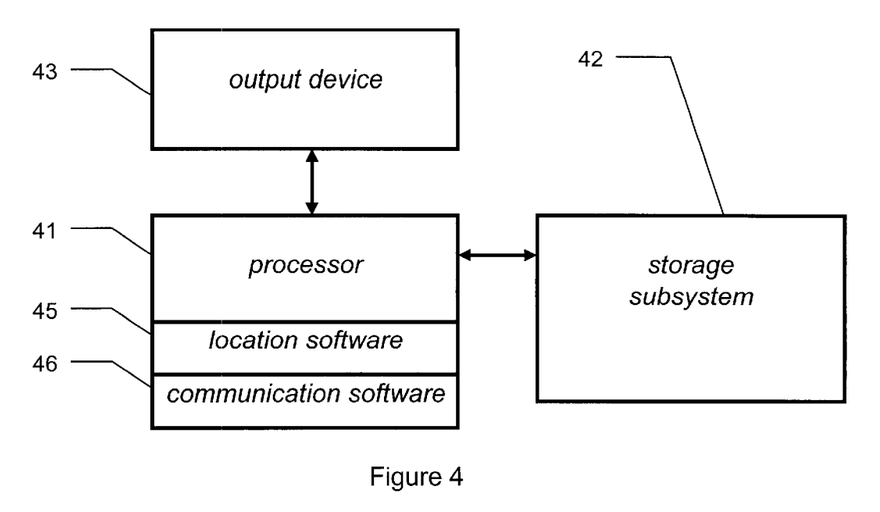
FIG. 4 is an illustration of a computer system suitable for practice of the present invention.

FIG. 4 shows a computer system adapted for use with the present invention. Processor 51 operatively connects with storage subsystem 52 and output device 53. Processor 51 can be, for example, a microprocessor such as those found in personal computers, a system such as those found in workstations, or a plurality of processors operating in parallel. Storage subsystem 52 can be, for example, an optical or electromagnetic disk storage system, a random access memory system, a electromagnetic tape storage system, or networked access to information stored remotely. Output device 53 can be, for example, a conventional computer display screen or a multi-dimensional virtual reality environment. A plurality of patents and the relationships therebetween can be stored in storage subsystem 52. Those skilled in the art will appreciate computer software 54 that can direct processor 51 to perform the steps disclosed above for locating the patents in a geometric space. After the patents are located, additional computer software 55 known to those skilled in the art can direct the communication of the patents in the geometric space using output device 53.

The present invention can be implemented on a O2 computer from Silicon Graphics, using internal connections to an Oracle 7 database server. The system can operate with Silicon Graphics' IRIX 6.3 Unix-based operating system. A user interface can be developed using the Tcl/Tk interface language. The O2 computer can comprise 256 MB of RAM, a 4 GB external Ultra-wide SCSI 3 disk for the Oracle 7 application, a 2 GB internal Ultra-wide SCSI 3 disk for the system and navigation software, and a R5000 SC processor operating at 185 MHz.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A method of mining data in a database composed of a plurality of related patents, comprising:

a) Determining a relationship between each pairing of patents by determining at least one predicate $P_k$ indicative of a relationship between patents, determining a weighting coefficient $c_k$ to be applied to each predicate $P_k$, determination of a time-based weighting $f_k(t)$ to be applied to each predicate $P_k$, and assigning a numeric value $S_{ij}$ representative of the relationship between the two patents according to $$S_{ij} = \sum_{k=1}^{m} c_k P_k f_k(t);$$

(b) assigning coordinates to each patent in an n-dimensional space, where n is at least two, and where patents are assigned coordinates so that distance in the n-dimensional space between two patents is representative of the relationship $S_{ij}$ between the two patents;

c) communicating an aspect of the n-dimensional space by communicating a representation of the n-dimensional space, where a characteristic of the representation varies with location in the representation based on the patents assigned coordinates in the vicinity of the location.

2. The method of claim 1, wherein the step of communicating an aspect comprises displaying the aspect, and wherein the characteristic is chosen from the group consisting of: the color of the displayed representation, the apparent height of a surface of the displayed representation, the brightness of the displayed representation, the apparent texture of a surface of the displayed representation, the intensity of a feedback signal, markers at coordinates assigned to entries, connections between related entries, and combinations thereof.

3. The method of claim 1, wherein a predicate $P_k$ is chosen from the group consisting of $P_{class}$, $P_{subclass}$, $P_{numclass}$, $P_{numsubclass}$, $P_{numwords}$, $P_{cite}$, $P_{cocite}$, $P_{numcocite}$, and combinations thereof.

4. The method of claim 1, wherein the step of determining at least one predicate $P_k$ comprises determining at least two predicates.

5. The method of claim 1, wherein each of the at least two predicates are chosen from the group consisting of $P_{class}$, $P_{subclass}$, $P_{numclass}$, $P_{numsubclass}$, $P_{numwords}$, $P_{cite}$, $P_{cocite}$, $P_{numcocite}$, and combinations thereof.

6. The method of claim 1, wherein for each patent$_i$, the relationship $S_{ij}$ between said patent$_i$ and patent$_j$ is indicated as zero for all except a subset comprising the highest $S_{ij}$ for patent$_i$.

7. The method of claim 1, wherein for the relationship $S_{ij}$ between any two patents is indicated as zero for all except a subset comprising the highest $S_{ij}$.

8. The method of claim 1, wherein the step of assigning coordinates comprises:

a) constructing a square matrix A(i,j), with rank of at least the number of patents, where A(i,j)=the negative of the numeric value assigned to the pairing of patent i and patent j, and where A(k,k)=the negative of the sum of all the other elements of the rowA(k,x);

b) determining the eigenvectors of A corresponding to the n+1 least eigenvalues; and c) assigning patent i coordinates in the n-dimensional space corresponding to element i of each of the eigenvectors determined in the previous step, omitting the eigenvector corresponding to the least eigenvalue.

9. The method of claim 1, wherein the step of assigning coordinates comprises:

a) Determining initial coordinates for each patent;

b) Determining an energy associated with each patent from said patent's distance and similarity to other patent s and from the density of patent s assigned coordinates near said patent's coordinates;

c) If a terminal condition is not reached, then:
  i) Assigning new coordinates to at least one patent;
  ii) Repeating from step b).

10. The method of claim 1, further comprising:

a) accepting input defining desired information concerning at least one patent; and b) communicating the desired information.

11. A computer system for communicating a database composed of a plurality of related patents, comprising:

a) a storage subsystem;

b) an output subsystem;

c) a processing subsystem connected to access the database stored in the storage subsystem and connected to control the operation of the output subsystem;

d) means for determining a relationship between each pairing of patents by determining at least one predicate $P_k$ indicative of a relationship between patents, determining a weighting coefficient $c_k$ to be applied to each predicate $P_k$, determination of a time-based weighting $f_k(t)$ to be applied to each predicate $P_k$, and assigning a numeric value $S_{ij}$ representative of the relationship between the two patents according to $$S_{ij} = \sum_{k=1}^{m} c_k P_k f_k(t);$$

e) means for assigning coordinates in an n-dimensional space to each patent, where n is at least two, and where patents are assigned coordinates so that the distance in the n-dimensional space between two patents is representative of the relationship $S_{ij}$ between the two patents;

f) means for selecting an aspect of the n-dimensional space; and g) means for communicating the selected aspect of the n-dimensional space by communicating a representation of the n-dimensional space, where a characteristic of the representation varies with location in the representation based on the patents assigned coordinates in the vicinity of the location.

12. The computer system of claim 11, wherein the means for communicating the selected aspect comprises means for displaying the selected aspect, and wherein the characteristic is chosen from the group consisting of: the color of the displayed representation, the apparent height of a surface of the displayed representation, the brightness of the displayed representation, the apparent texture of a surface of the displayed representation, the intensity of a feedback signal, markers at coordinates assigned to entries, connections between related entries, and combinations thereof.

13. The computer system of claim 11, wherein the means for assigning coordinates comprises:

a) means for constructing a square matrix A(i,j), with rank of at least the number of patents, where A(i,j)=the negative of the numeric value assigned to the pairing of patent i and patent j, and where A(k,k)=the negative of the sum of all the other elements of the row A(k,x);

b) means for determining the eigenvectors of A corresponding to the n+1 least eigenvalues; and c) means for assigning patent i coordinates in the n-dimensional space corresponding to element i of each of the eigenvectors determined in the previous step, omitting the eigenvector corresponding to the least eigenvalue.

14. The computer system of claim 11, wherein the means for assigning coordinates comprises:

a) means for determining initial coordinates for each patent;

b) means for determining an energy associated with each patent from said patent's distance and similarity to other patent s and from the density of patent s assigned coordinates near said patent's coordinates;

c) means for determining if a terminal condition is not reached, and if not then:
   i) Assigning new coordinates to at least one patent;
   ii) Repeating from step b).

15. The computer system of claim 11, wherein a predicate $P_k$ is chosen from the group consisting of $P_{class}$, $P_{subclass}$, $P_{numclass}$, $P_{numwords}$, $P_{cite}$, $P_{cocite}$, $P_{numcocite}$, and combinations thereof.

16. The computer system of claim 11, wherein th e step of determining at least one predicate $P_k$ comprises determining at least two predicates.

17. The computer system of claim 11, wherein each of the at least two predicates are chosen from the group consisting of $P_{class}$, $P_{subclass}$, $P_{numclass}$, $P_{numwords}$, $P_{cite}$, $P_{cocite}$, $P_{numcocite}$, and combinations thereof.

18. The computer system of claim 11, further comprising:
a) means for accepting input defining desired information concerning at least one patent;
b) means for communicating the desired information.

19. The computer system of claim 11, wherein for each $patent_i$, the relationship $S_{ij}$ between said $patent_i$ and $patent_j$ is indicated as zero for all except a subset comprising the highest $S_{ij}$ for $patent_i$.

20. The computer system of claim 11, wherein for the relationship $S_{ij}$ between any two patents is indicated as zero for all except a subset comprising the highest $S_{ij}$.

* * * * *